(12) United States Patent
Wang et al.

(10) Patent No.: US 11,070,584 B1
(45) Date of Patent: Jul. 20, 2021

(54) GRACEFUL NEUTRALIZATION OF INDUSTRIAL ASSETT ATTACK USING CRUISE CONTROL

(71) Applicant: GENERAL ELECTRIC COMPANY, Schenectady, NY (US)

(72) Inventors: Honggang Wang, Clifton Park, NY (US); Masoud Abbaszadeh, Clifton Park, NY (US); Mustafa Tekin Dokucu, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/734,499

(22) Filed: Jan. 6, 2020

(51) Int. Cl.
*H04L 29/06* (2006.01)
*G05B 19/406* (2006.01)

(52) U.S. Cl.
CPC ...... *H04L 63/1441* (2013.01); *H04L 63/1416* (2013.01); *H04L 63/1425* (2013.01); *G05B 19/406* (2013.01); *G05B 2219/50193* (2013.01)

(58) Field of Classification Search
CPC ............. H04L 63/1441; H04L 63/1416; H04L 63/1425; G05B 2219/50193; G05B 19/406
USPC .......................................................... 726/23
See application file for complete search history.

(56) References Cited

U.S. PATENT DOCUMENTS

| | | | |
|---|---|---|---|
| 6,159,626 A | 12/2000 | Keskula et al. | |
| 6,649,292 B2 | 11/2003 | Breuer et al. | |
| 6,953,630 B2 | 10/2005 | Wells | |
| 9,160,760 B2 * | 10/2015 | Vasseur | H04L 63/1425 |
| 9,516,053 B1 * | 12/2016 | Muddu | G06N 5/04 |
| 9,834,846 B2 | 12/2017 | Mermelstein et al. | |
| 10,356,122 B2 * | 7/2019 | Ruvio | H04L 63/1408 |
| 10,469,524 B2 * | 11/2019 | Ben-Shalom | H04L 63/1441 |
| 2004/0164206 A1 * | 8/2004 | Jammu | B60L 3/0023 |
| | | | 246/167 R |

(Continued)

FOREIGN PATENT DOCUMENTS

| | | |
|---|---|---|
| RU | 2526851 C1 | 8/2014 |
| RU | 2653055 C1 | 5/2018 |

OTHER PUBLICATIONS

Viswanatha et al., "Microcontroller Based Bidirectional Buck-Boost Converter for Photo-Voltaic Power Plant", Electrical Systems and Information Technology, vol. 5, Issue: 3, pp. 745-758, Dec. 2018.

*Primary Examiner* — Badrinarayanan Champakesan
(74) *Attorney, Agent, or Firm* — Buckley, Maschoff & Talwalkar LLC

(57) ABSTRACT

A procedure for neutralizing an attack on a control system of an industrial asset includes detecting an anomaly in a first sensor node associated with a first unit operating in a first operational mode, and receiving time series data associated with the first sensor node. A subset of the time series data is provided to each of a plurality of virtual sensor models A first virtual sensor model is selected from among a plurality of virtual sensor models based upon the subset of the time series data received by each of the plurality of virtual sensor models. A first confidence level of the first virtual sensor is determined. Responsive to determining that the first confidence level is below a first confidence level threshold, the first unit is transferred to a second operational mode using sensor readings associated with a second sensor node of a second unit of the industrial asset.

18 Claims, 11 Drawing Sheets

(56) References Cited

U.S. PATENT DOCUMENTS

| | | | |
|---|---|---|---|
| 2009/0222776 A1* | 9/2009 | Meers | G05B 17/02 |
| | | | 716/106 |
| 2013/0101873 A1 | 4/2013 | Dionne et al. | |
| 2016/0006756 A1* | 1/2016 | Ismael | G06F 21/57 |
| | | | 726/22 |
| 2016/0259308 A1* | 9/2016 | Fadell | H04W 4/80 |
| 2016/0371316 A1* | 12/2016 | Okanohara | G06N 3/0454 |
| 2017/0076217 A1* | 3/2017 | Krumm | G06N 20/00 |
| 2018/0053400 A1* | 2/2018 | Abado | G05B 23/0224 |
| 2018/0255091 A1* | 9/2018 | Mestha | H04L 63/1416 |
| 2019/0306187 A1* | 10/2019 | Dyakin | H04L 63/1441 |
| 2019/0324431 A1* | 10/2019 | Celia | G06N 3/006 |
| 2020/0106785 A1* | 4/2020 | Abbaszadeh | H04L 63/145 |
| 2020/0327425 A1* | 10/2020 | Chaturvedi | G06Q 10/20 |

\* cited by examiner

GRACEFUL NEUTRALIZATION OF INDUSTRIAL ASSETT ATTACK USING CRUISE CONTROL

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or even catastrophic damage to a plant.

Some traditional procedures for detecting cyber-attacks to protect industrial assets include reconstructing a signal from a critical node of the industrial asset and determining a confidence level of the critical node signal reconstruction. In such cases, the critical node is often required to contain a hardened sensor for reconstruction of the critical node signal. If the critical node signal reconstruction is at a low confidence level, an attack is suspected to be occurring and the system initiates an emergency shutdown procedure or emergency stop (E-STOP) of the industrial asset to protect the industrial asset from the suspected attack. However, shutdown, especially emergency shutdown, may cause significant economic loss or life consumption loss. For example, the life of a fuel cell system may be determined by a certain number of thermal cycles or a number of shutdowns. It would therefore be desirable to provide an approach to neutralizing an attack in a graceful manner to extend equipment life of an industrial asset and gain operating savings.

SUMMARY

According to some embodiments, a method for neutralizing an attack on a control system of an industrial asset includes detecting an anomaly in a first sensor node associated with a first unit of the industrial asset, the first unit operating in a first operational mode. The method further includes receiving time series data associated with the first sensor node, and providing a subset of the time series data to each of a plurality of virtual sensor models. The method further includes selecting a first virtual sensor model from among a plurality of virtual sensor models based upon the subset of the time series data received by each of the plurality of virtual sensor models. The method further includes determining a first confidence level of the first virtual sensor, and determining that the first confidence level is below a first confidence level threshold. The method further includes transferring, responsive to the determining that the first confidence level is below the first confidence level threshold, the first unit to a second operational mode using sensor readings associated with a second sensor node of a second unit of the industrial asset.

According to some embodiments, a system for neutralizing an attack on a control system of an industrial asset includes a first unit of the industrial asset including a first sensor node, the first unit configured to operate in a first operational mode; a second unit of the industrial asset including a second sensor node; and one or more controllers. The one or more controllers are configured to detect an anomaly in the first sensor node, receive time series data associated with the first sensor node, and provide a subset of the time series data to each of a plurality of virtual sensor models. The one or more controllers are further configured to select a first virtual sensor model from among a plurality of virtual sensor models based upon the subset of the time series data received by each of the plurality of virtual sensor models. The one or more controllers are further configured to determine a first confidence level of the first virtual sensor, and determine that the first confidence level is below a first confidence level threshold. The one or more controllers are further configured to transfer, responsive to the determining that the first confidence level is below the first confidence level threshold, the first unit to a second operational mode using sensor readings associated with a second sensor node of a second unit of the industrial asset.

Some technical advantages of some embodiments disclosed herein are improved systems and methods for neutralizing an attack on a control system of an industrial asset in a graceful manner to extend equipment life, gain operational saving, and reduce the cost of critical node hardening.

DETAILED DESCRIPTION

Figure 1:
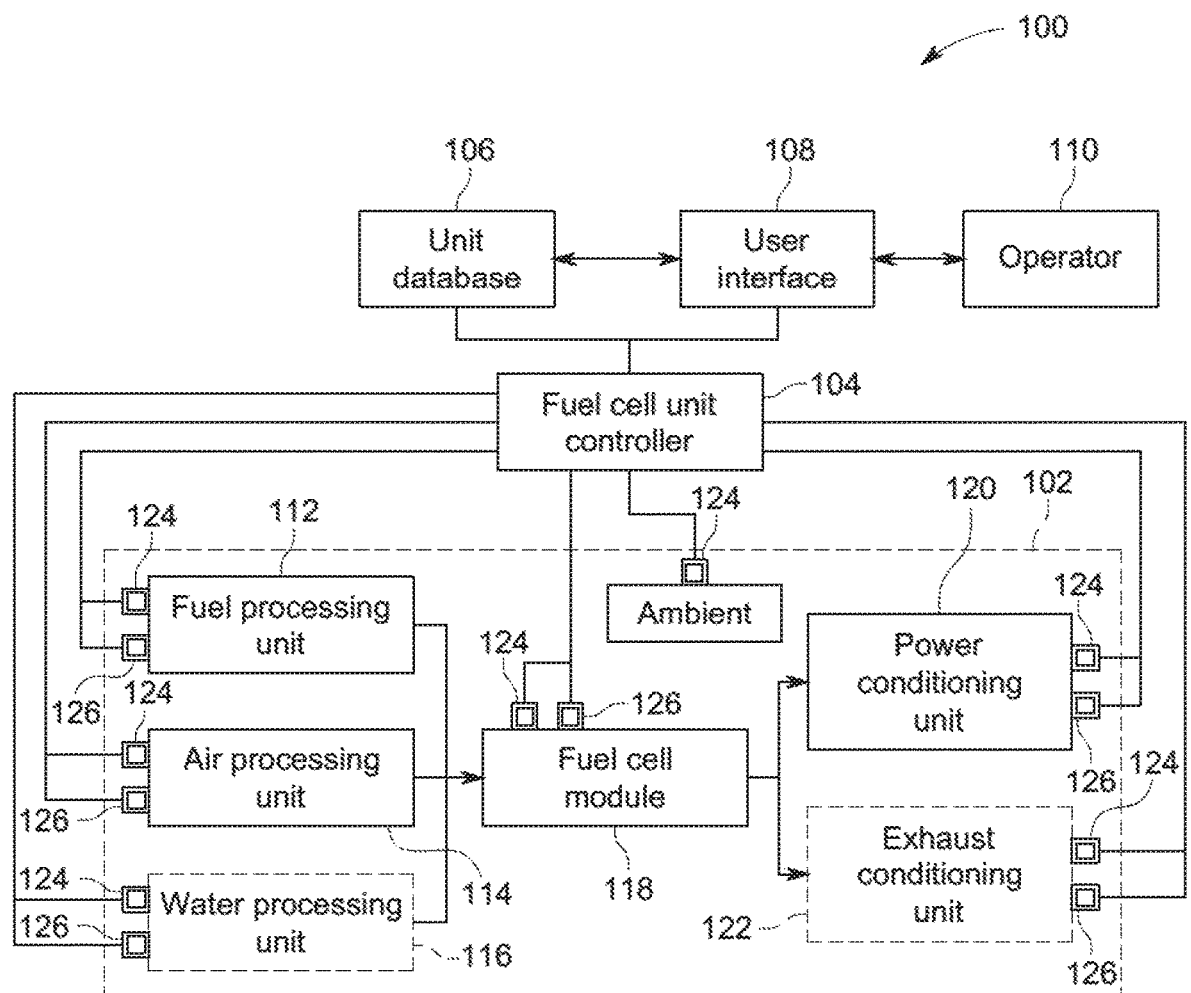
FIG. 1 is a high-level block diagram of a system that may be provided in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein may provide a system and method for graceful neutralization of cyber-attacks of an industrial asset or enterprise asset using a cruise control procedure. Industrial assets for power generation often use multiple identical or nearly identical power generation units on a site. For example, one fuel cell control unit may handle 250 KW of power. For a 10 MW site installation, forty fuel cell and control units may be at the site. For cost and maintenance considerations, manufacturers tend to use identical fuel cell and controller units which results in a high probability that two or more units exhibit very similar or nearly identical behavior during operation. Some embodiments described herein exploit this feature of similar behavior of two or more units to determine whether a node of an industrial asset under attack without requiring good signal reconstruction and enabling a "cruise control" mode of operation when a critical node is under attack. Use of a cruise control mode of operation allows the attack to be neutralized in a graceful manner as further described herein.

A typical power plant tends to operate in different modes. A first operational mode includes a performance based mode, such as a maximal output mode, maximal efficiency mode, maximal profit mode, minimal energy consumption mode, etc. Another common operational mode is a base load mode in which the plant is operating at a comfort zone, meaning the working point is far from a boundary condition. Another common mode is the a cold standby, repair mode, or OFF mode. Since a majority of the time of operation of an industrial asset is in the performance based mode, an assumption can be made that the industrial asset is working in the performance based mode before an attack occurs. In some embodiments, after an attack occurs the system stays at the performance based operation mode if a confidence level of a virtual sensor is at a high level. If the confidence level of the virtual sensor is at a defined medium level, the system moves to the base load operation mode. In an alternative, the system may move to a predefined operational zone that is less sensitive to the attacked sensor.

In some embodiments, an attacked system A moves to the base load operation or the cold standby mode under a cruise control operation navigated by a mirrored system B. The mirrored system B is previously identified with an acceptable high similarity of behavior to the attacked system A before the attack on system A. Accordingly, although system A has lost critical sensor readings from due to a critical node being under attack, system A is guided by a control sequence under the control of system B to transition to the base load mode of operation or the cold standby mode of operation safely by leveraging the sensor reading of system B. In an alternative embodiment, the cruise control of system A may be controlled by a central controller in communication with both system A and system B in which the central controller uses sensor readings from system B to guide the transition of system A to the base load mode of operation or the cold standby mode of operation.

Some embodiments described herein are associated with time series data from one or more monitoring nodes from a physical (i.e., industrial or enterprise) asset and provides reliable replay attack detection. Monitoring nodes may include, for example, sensors, actuators, and/or controller nodes. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. The features may be computed at the local level (associated with each monitoring node) and/or the global level (associated with all the monitoring nodes, i.e., the whole asset). The time-domain values of the nodes or their extracted features may be, according to some embodiments, normalized for better numerical conditioning.

FIG. 1 is a high-level block diagram of a system 100 that may be provided in accordance with some embodiments. The system 100 illustrates a single fuel cell unit 102 configured to implement a fuel cell process and includes a fuel cell unit controller 104, a unit database 106, and a user interface 108. In some embodiments, the single fuel cell unit 102 may represent a single industrial asset of a system having a number of the same or similar assets as that of single fuel cell unit 102. The user interface 108 is configured to allow an operator 110 to monitor and control the fuel cell unit 102 via the fuel cell unit controller 104. The fuel cell unit 102 includes a fuel processing unit 112, an air processing unit 114, a water processing unit 116, a fuel cell module 118, a power conditioning module 120, an exhaust conditioning module 122, and instrumentation nodes 124. The instrumentation nodes 124 may include one or more sensors, for example, temperature sensors, pressure sensors, and humidity sensors. Temperature sensors may monitor parameters such as ambient temperature, fuel inlet and exhaust temperature, air inlet and exhaust temperature, steam temperature, fuel cell box temperature and fuel cell body temperature. Pressure sensors may monitor ambient pressure, fuel inlet and exhaust pressure, air inlet and exhaust pressure, steam pressure, fuel cell box pressure, and fuel cell inlet and outlet pressure. Humidity sensors, such as wet and dry bulb thermometers, may measure ambient humidity in an inlet duct of an air compressor. The sensors of instrumentation nodes 124 may also include flow sensors, speed sensors, flame detector sensors, valve position sensors, differential pressure sensors and other sensors that are typically used to measure various operating parameters and conditions relative to the operation of the fuel cell unit 102. In a particular embodiment, each instrumentation node 110 may be a standalone distributed I/O module.

The system 100 also includes several actuators 126 to mechanically control the operation of the fuel cell unit 102. The actuators 126 may include electro-mechanical devices having variable setpoints or settings that allow the manipulation of certain process inputs (i.e., manipulated variables) for the control of process outputs (i.e., controlled variables) in accordance with a desired result or mode of operation. For example, commands generated by the fuel cell unit controller 104 may cause one or more actuators 126 to adjust valves between the fuel supply and fuel cell that regulate the flow level, fuel splits, and/or type of fuel being combustor. As another example, commands generated by fuel cell unit controller 104 may cause one or more actuators 126 to adjust an air blower speed or air inlet valve.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 2:
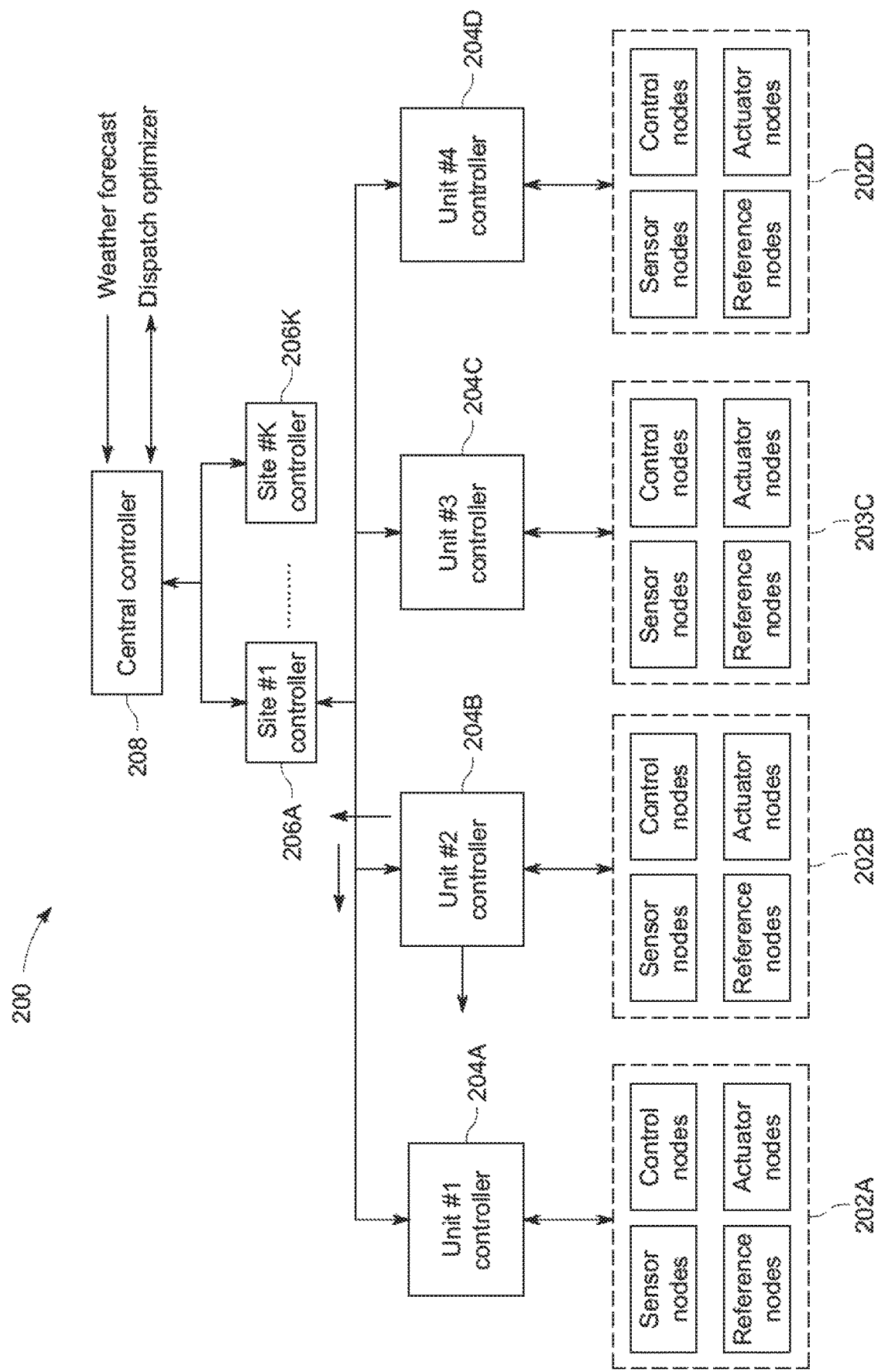
FIG. 2 is a high-level block diagram of an attack neutralization system using a cruise control procedure for a hierarchical control structure that may be provided in accordance with some embodiments.

FIG. 2 is a high-level block diagram of an attack neutralization system 200 using a cruise control procedure for a hierarchical control structure that may be provided in accordance with some embodiments. The attack neutralization system 200 includes a plurality of units 202A-202D each in communication with a corresponding unit controller 204A-204D. In a particular embodiment, each of the units 202A-202D is a fuel cell unit. Each fuel cell unit 202A-202D includes sensor nodes, control nodes, reference nodes, and actuator nodes. Each of the unit controllers 204A-204D is in communication with a first site controller 206A of a plurality of site controllers 206A-206K. Each of the plurality of site controllers 206A-206K is further communication with a central controller 208. In particular embodiments, the industrial control system is a modular control system for one or more of a fuel cell, a wind farm, or an energy storage system.

A first layer in the hierarchical control structure is distributed I/O at the node level (e.g. sensor nodes, control nodes, reference nodes, and actuator nodes) within each unit 202A-202D, and a second layer are the unit controllers 204A-204D which manage the node level I/O. The third layer in the hierarchical control structure includes the site controller 206A which oversees multiple unit controllers 204A-204D at one installation site, such as a data center or commercial building. The site controller 206A-206K may determine the optimal power schedules for multiple units at local site to achieve a Power Purchase Agreement (PPA) while also receiving information from the central controller 208 for other high priority demands.

The central controller 208 is operated by the system operator which oversees the fleet with life-cycle management including production, scheduling, maintenance, replacement and recycle operations. In certain embodiments, the central controller 208 may be a regional controller configured to control site controllers within a particular geographic region. The central controller 208 is configured to receive local weather measurement and forecast information, and communicate with a dispatch optimizer. One or more of the unit controllers 204A-204D and the site controllers 206A-206K may be configured to access the local weather measurement and forecast such as temperature, pressure, and humidity.

FIG. 2 illustrates an exemplary "smooth transfer" control from a mirrored unit to an attacked unit. In the illustrated example, unit 202A is identified as the attacked unit and unit 202B is determined to be a mirrored unit. Suppose a critical sensor node in unit 202A is identified as under attack. In some embodiments, a cruise control procedure to gracefully neutralize the attack may start immediately after two conditions are met: 1) the mirrored unit 202B is confirmed to have acceptable similarity with the attacked unit 202B, and 2) the mirrored unit 202B is not under attack. In some embodiments, a measure of similarity between unit 202A and unit 202B may be one or more of a structural similarity or an operational similarity. In some embodiments, the control communication may be implemented via a direct communication link between unit controller 204A and unit controller 204B. In alternative embodiments, a higher-level master controller such as site controller #1 206A transmits the control settings of unit 202B to 202A. In such embodiments, the site controller #1 206A may first match the control state in unit 202A to that of unit 202B. Subsequently, the site #1 controller #1 206A may oversee and drive unit 202A in a cruise control mode in which all control actions in unit 202A follow the control actions in unit 202B.

A key aspect of some embodiments is to facilitate a smooth transfer or bump-less transfer of the control system in unit 202A during transition to cruise control. In some embodiments, unit 202A is forced to track to unit 202B before the transfer, which is more reliable since unit 202B is more observable than unit 202A. In an embodiment, the conventional controller output tracking in unit 202A is used in which the controller is tracking controller output of unit 202B. In another embodiment, all control loops in each unit are first set to a remote control mode and start to operate the system synchronously from a lower level such as an actuator demand level. In a fuel cell system example, all high level control loops may be temporarily disabled and only remotely control of the fuel valve, air valve position and speed of recirculation blower are used. Once the other observable system state or output nodes are matched, the cruise control begins. Accordingly, use of the cruise control procedure described with respect to some embodiments enables neutralization of the attack in a graceful manner. Some embodiments may provide benefits such as extending equipment life as well as additional operating savings. Another benefit that may be provide in some embodiments is to reduce the cost associated with hardening of a critical node.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 3:
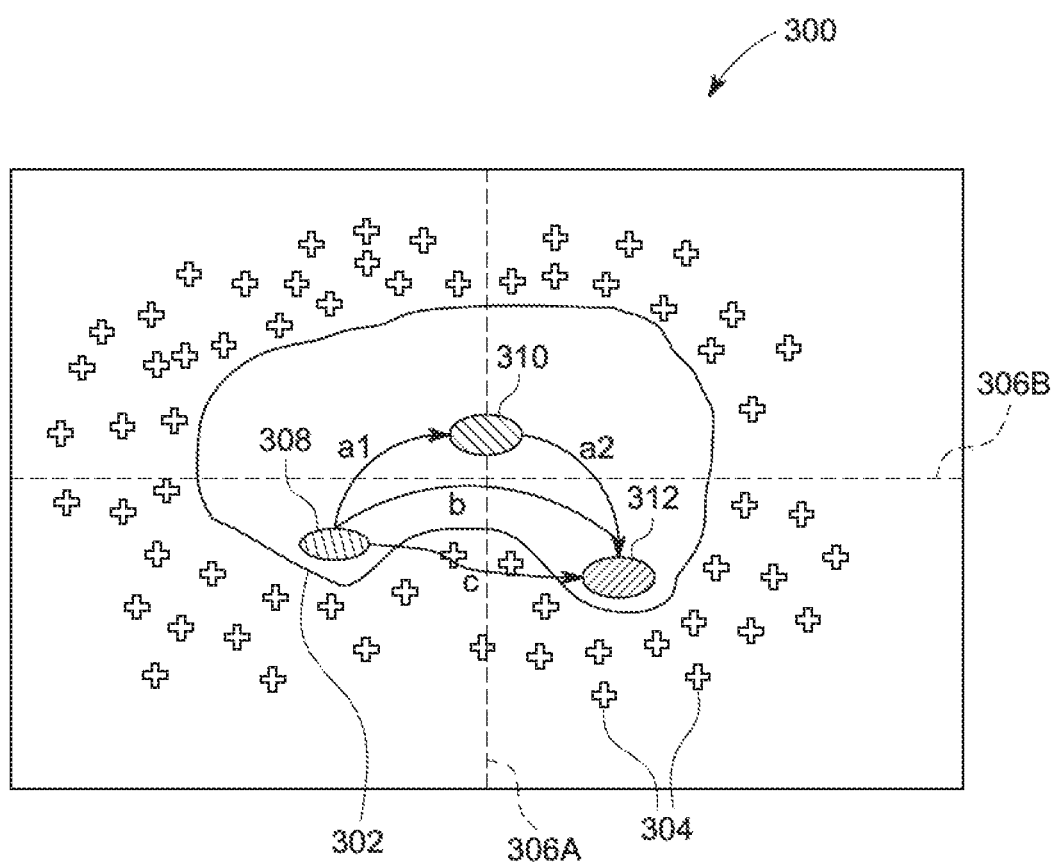
FIG. 3 is a simplified diagram of boundaries and locations of feature vectors for sensor node parameters associated with a threat neutralization process using a mirrored system to implement a cruise control procedure in accordance with some embodiments.

FIG. 3 is a simplified diagram of boundaries and locations of feature vectors for sensor node parameters associated with a threat neutralization process 300 using a mirrored system to implement a cruise control procedure in accordance with some embodiments. FIG. 3 illustrates an operational space for an industrial asset including a number of operational zones. Inside a decision boundary 302 is a normal operation zone (e.g., off, idle, standby, base load, etc.) of the industrial asset and outside is an abnormal zone of operation of the industrial asset such as a threat zone 304. For simplicity of illustration, FIG. 3 shows two features, Feature #1 306A and Feature #2 306B, representative of the operating space of the industrial asset. However, in other embodiment more than two features may be used to represent an operating space of an industrial asset. In some embodiments, each of the features may be associated with one or more sensor virtual sensor values measured at one or more sensor nodes of the industrial asset. In some embodiments, a virtual sensor value is obtained from an output of a virtual sensor constructed of a combination of actual sensor inputs during an offline training process as further described herein.

FIG. 3 illustrates a performance based mode 308, a base load mode 310, and a cold standby, repair, or OFF mode 312 within the decision boundary 302. The performance based mode 308 may include a maximal output mode, maximal efficiency mode, maximal profit mode, minimal energy consumption mode, or other mode representative of a desired high performance of the industrial asset. The base load mode 310 is an operational mode in which the industrial asset is working at its comfort zone, meaning the working point is far from the boundary condition represented by decision boundary 302. The cold standby, repair or OFF mode 312 is an operational mode in which the industrial asset is not operating to produce a substantial output.

Since a majority of the operational time of an industrial asset is typically spent in the performance based mode, it is assumed that the system is operating in the performance based mode 308 before an attack occurs. After an attack occurs on a unit A of the industrial asset, the system may execute a number of actions. One action can be to stay at the performance based zone 308, if a confidence level of the virtual sensor is at a predetermine high value. Another action can be to transfer the unit to the base load zone 310 if the confidence level of the virtual sensor is at a predetermined medium value. Alternatively, the system may transition the unit to a predefined zone which is less sensitive to the attacked sensor. Another action can be to move the unit to the base load zone 310 or the cold standby zone 312 under a "cruise control" procedure navigated by another mirrored unit B that has been identified with adequate high similarity to the attacked unit A before the attack occurs. In some embodiments, the cruise control may include a control system A following directly by a control system B in terms of control sequence. Even though the attacked unit A has lost its critical sensor node (e.g., the critical node under attack), the attacked unit A may transition to the base load zone 310 or cold standby zone 312 safely by leveraging the sensor of system B. Alternatively, the cruise control may be driven by a central controller that communicates with both controller A and B in which the central controller uses information from unit B to guide unit A to the desired operational mode.

Figure 4:
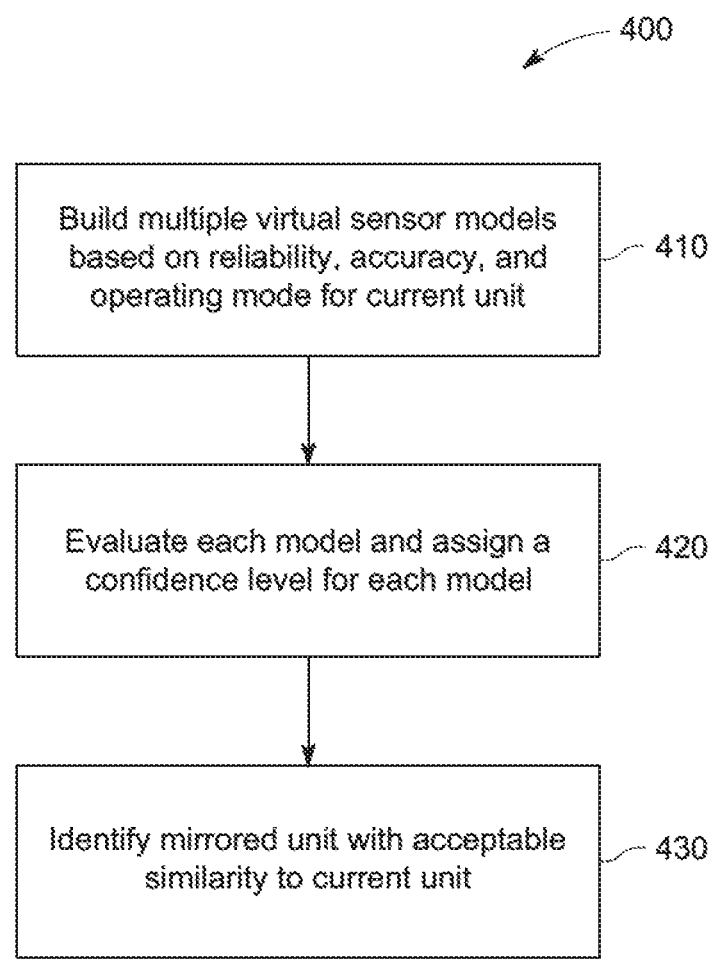
FIG. 4 is simplified flowchart of an offline virtual sensor model training method of in accordance with some embodiments.

FIG. 4 is simplified flowchart 400 of an offline virtual sensor model training method of in accordance with some embodiments. The flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

In some embodiments, the offline virtual sensor model training may be implemented in the system of FIG. 2 prior to the occurrence of an attack on the system. In 410, the system builds multiple virtual sensor models for a current unit under consideration based upon reliability and accuracy of a plurality of sensors associated with a critical sensor node of the unit, and operating mode of the unit. In some embodiments, each of the virtual sensor models is based upon a subset of a plurality of sensor values associated with the critical sensor node. In some embodiments, each of the plurality of sensor values chosen for each virtual sensor model is determined based upon a reliability and/or accuracy of the sensor value as well as the operating mode of the unit. In an example, a critical node may have four sensor values (X1, X2, X3, X4) associated with the critical sensor node. In the example, a first virtual sensor model may be trained using sensor values X1, X2, and X3; a second virtual sensor model may be trained using sensor values X2 and X3; a third virtual sensor model may be trained using sensor values X1 and X3; a four virtual sensor model may be trained using sensor values X1 and X2; and a fifth virtual sensor model may be trained using sensor values X1 and X4.

In 420, the system evaluates each virtual sensor model and assigns a confidence level to the virtual sensor model. In some embodiments, each virtual sensor is trained based upon historical data during the offline modeling process, and an overall training error from each different virtual sensor model is determined. Virtual sensor models with the highest training error are assigned the lowest confidence level, while virtual sensor models with the lowest training error are assigned the highest confidence level. In some embodiments, each virtual sensor model is assigned either a high confidence level, a medium confidence level, and a low confidence level. In some embodiments, the confidence level is determined based upon a relative performance of each of the virtual sensor models during the offline training phase. In some embodiments, the confidence level is determined based upon a cost function applied to a level of disruption cause by each of a plurality of operating states.

In 430, the system identifies a mirrored unit with an acceptable similarity to the current unit under consideration. The identified mirrored unit will function as the mirrored unit to the current unit if the current unit is determined to be under attack. In some embodiments, the mirrored unit is identified based upon pattern matching on the features derived from among a plurality of available units and the attacked unit. In some embodiments, the pattern matching is based upon similarity metrics derived by the feature data from the plurality of available units and the attacked units.

Similarity metrics may include distance-based measures (e.g., Euclidean distance and Manhattan distance), statistical-based measures (e.g., correlation coefficient), and/or information-based measures (e.g., normalized information distance). Other examples of similarity measures include but are not limited to: Mean square errors (MSEs) or a mean squared deviation (MSD) of an estimator (e.g., of a procedure for estimating an unobserved quantity) may measure an average of the squares of errors—that is, the average squared difference between the estimated values and the actual value. MSE is a risk function, corresponding to the expected value of the squared error loss. The fact that MSE is almost always strictly positive (and not zero) is because of randomness or because the estimator does not account for information that could produce a more accurate estimate, for example.

A Manhattan distance includes a distance between two points measured along axes at right angles. A sum of absolute errors (SAE) comprises a sum of the absolute values of the vertical "residuals" between points generated by a function and corresponding points in the data. A short time series (STS) distance may comprise a square of the gradient distance between two time series data, for example.

Cosine similarity refers to a measure of similarity between two non-zero vectors of an inner product space that measures the cosine of the angle between them. The cosine of 0° is 1, and is less than 1 for any angle in the interval (0,π] radians. A cosine similarity is thus a judgment of orientation and not magnitude: two vectors with the same orientation have a cosine similarity of 1, two vectors oriented at 90° relative to each other have a similarity of 0, and two vectors diametrically opposed have a similarity of −1, independent of their magnitude.

A correlation coefficient may comprise a numerical measure of some type of correlation, representing a statistical relationship between two variables. The variables may include two columns of a given data set of observations, e.g., a "sample," or two components of a multivariate random variable with a known distribution, for example.

Dynamic time warping (DTW) may include an algorithm for measuring similarity between two temporal sequences which may vary in speed. For instance, similarities in walking could be detected using DTW, even if one person was walking faster than the other, or if there were accelerations and decelerations during the course of an observation.

Figure 5:
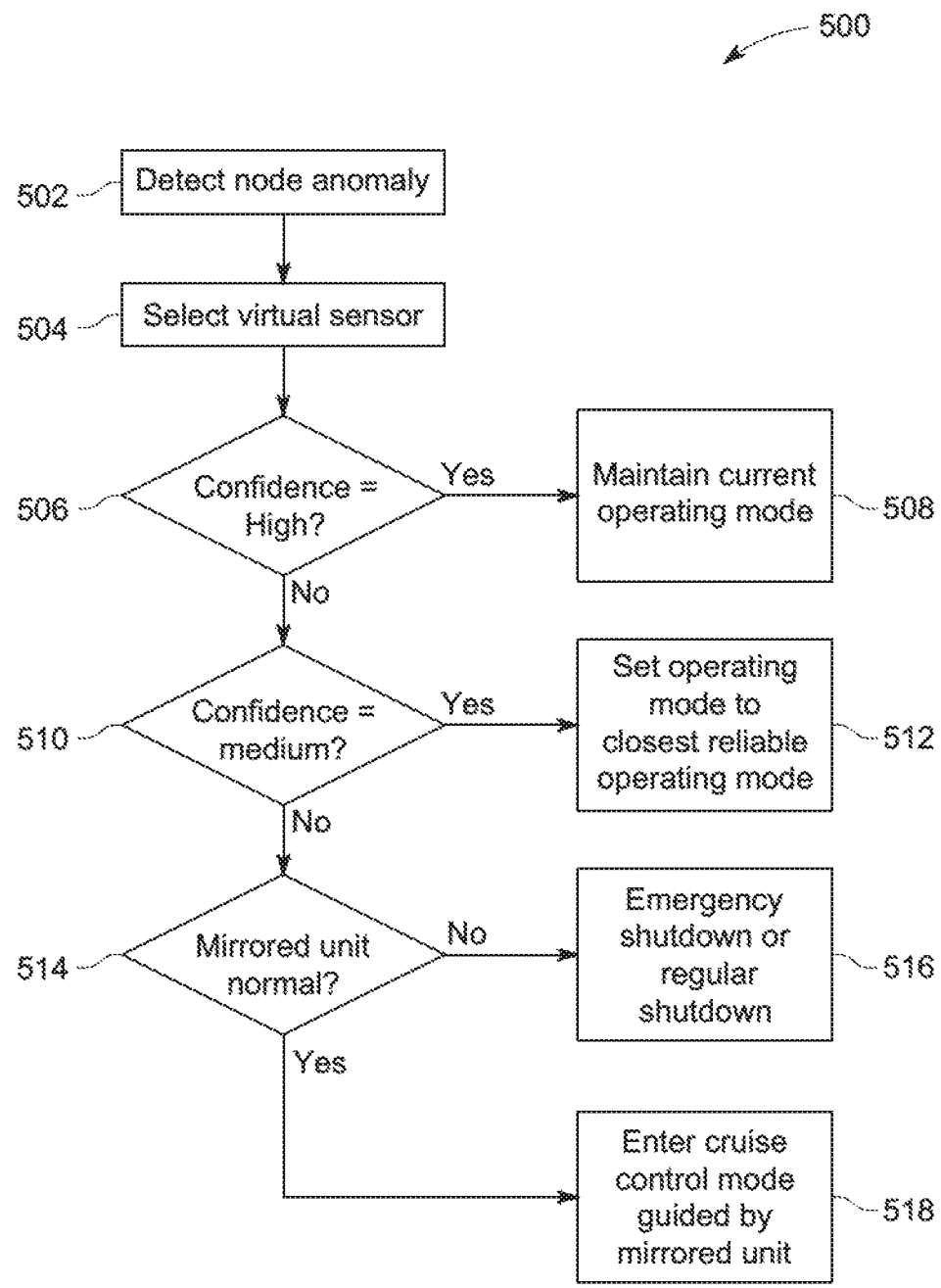
FIG. 5 is simplified flowchart of an online attack neutralization method using a cruise control procedure in accordance with some embodiments.

FIG. 5 is simplified flowchart 500 of an online attack neutralization method using a cruise control procedure in accordance with some embodiments. In some embodiments, the method may be implemented in the system of FIG. 1 after the offline training procedure of FIG. 4 is performed. In some embodiments, the attack neutralization method may be performed by a controller associated with an industrial asset such as a unit controller or site controller. In 502, the system detects a node anomaly associated with a sensor node of a first unit that is indicative of a possible attack upon the sensor node. In some embodiments, the system detects the node anomaly using a suitable detection and localization algorithm.

In 504, the system selects a virtual sensor from the plurality of virtual sensors based upon a confidence level and integrity of the virtual sensor's inputs. For example, in a particular embodiment the system selects the virtual sensor having the highest confidence level among the plurality of virtual sensors. In 506, the system determines if the confidence level of the selected virtual sensor is greater than a predefined high confidence level threshold (e.g., at a high confidence level). If the confidence level of the selected virtual sensor is greater than the high confidence level threshold, the method continues to 508. In 508, the system maintains the current operating mode of the first unit. If the confidence level of the selected virtual sensor is not greater than the high confidence level, the method continues to 510.

In 510, the system determines whether the confidence level of the selected virtual sensor is greater than a predefined medium confidence level threshold. If the confidence level of the selected virtual sensor is greater than the predefined medium confidence level threshold, the method continues to 512. In 512, the system sets the operating mode of the first unit to the closest reliable operating mode. If the confidence level of the selected virtual sensor is not greater than the predefined medium confidence level, the method continues to 514.

In 514, the system determines whether a second unit previously identified as a mirror unit to the first unit is operating in a normal manner. If the second unit is not operating in a normal manner, the method continues to 516. In 516, the system initiates an emergency shutdown or regular shutdown procedure for the first unit. If the second unit is operating in a normal manner, the method continues to 518. In 518, the system enters a cruise control mode in which the first unit is guided to an operating mode to mirror that of the second unit.

Figure 6:
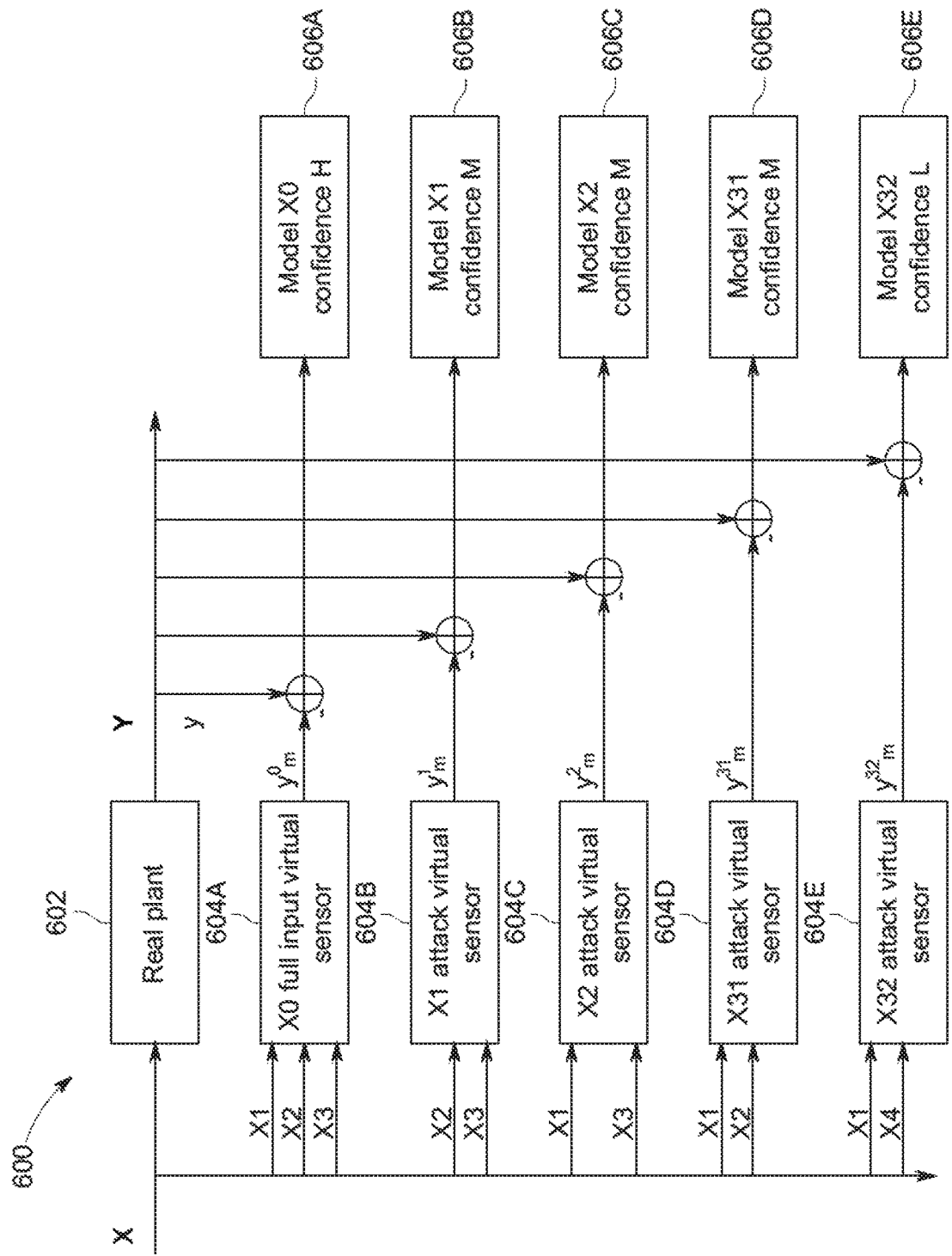
FIG. 6 is a high-level block diagram of an offline virtual sensor training process for a critical node in accordance with some embodiments.

FIG. 6 is a high-level block diagram 600 of an offline virtual sensor training process for a critical node in accordance with some embodiments. FIG. 6 shows an offline virtual sensor training process for a critical node y associated with a real plaint 602. A critical response set measurement Y is related to the factor set X as input the real plant 602. In the illustration of FIG. 6, the factor set X includes a first input X1, a second input X2, a third input X3, and a fourth input X4. In particular embodiments, the factor set X may include time series data associated with one or more sensors. X0 full input virtual sensor model 604A is built using inputs X1, X2, and X3. X1 attack virtual sensor model 604B is built using inputs X2 and X3 under the assumption that X1 is under attack. X2 attack virtual sensor model 604C is built using inputs X1 and X3 under the assumption that X2 is under attack. X31 attack virtual sensor model 604D is built using inputs X1 and X2 under the assumption that X3 and X1 are under attack. X32 attack virtual sensor model 604E is built using inputs X1 and X4 under the assumption that X3 and X2 are under attack.

Instead of building one model for the one critical node y, multiple virtual sensor models 604A-604E are built considering both accuracy and reliability of the sensor inputs. Virtual sensor input models based on multiple inputs, such as X0 full input virtual sensor model 604A, tend to have higher accuracy. However, it may have lower reliability due to its high probability of being under attack. Each virtual sensor model 604A-604E is tuned based on historical data during offline modeling process and the overall training error from different models. The models with highest training error (such as X32 with input X1 and X4) will be given the lowest confidence L, and vice versa. The model confidence level (or accuracy) is also allocated during offline training process for use directly during online application. In some embodiments, the model confidence level obtained during offline training phase instead of an online application is specifically designed to consider the potential time lag of fault/attack detection or localization. If the attack or fault causes the critical node's measurement to slowly drift away from its true value, then any model confidence level determined on-line may cause unreasonable model selection for decision of control actions.

In the illustrated embodiment, the virtual sensor model confidence level can be High, Medium and Low. As shown in FIG. 6, the model X0 confidence 606A is assigned a high confidence level (H), the model X1 confidence 606B is assigned a medium confidence level (M), the model X2 is assigned a medium confidence (M), the model X32 confidence 606D is a assigned a medium confidence (M), and the model X32 confidence 606E is assigned a low confidence (L). It should be noted that the X31 attack virtual sensor model 604D has a model confidence level M compared to the X32 virtual sensor model 604E with conference level L, mainly because the compounding effect of X2 and X1 is better than model driven by X4 and X1.

The virtual sensor models in FIG. 6 are shown featured by inputs only. It should be understood that other embodiments, each virtual sensor model may represent a model ensemble further based on other factors such as operating mode, ambient condition, fuel type, etc.

Figure 7:
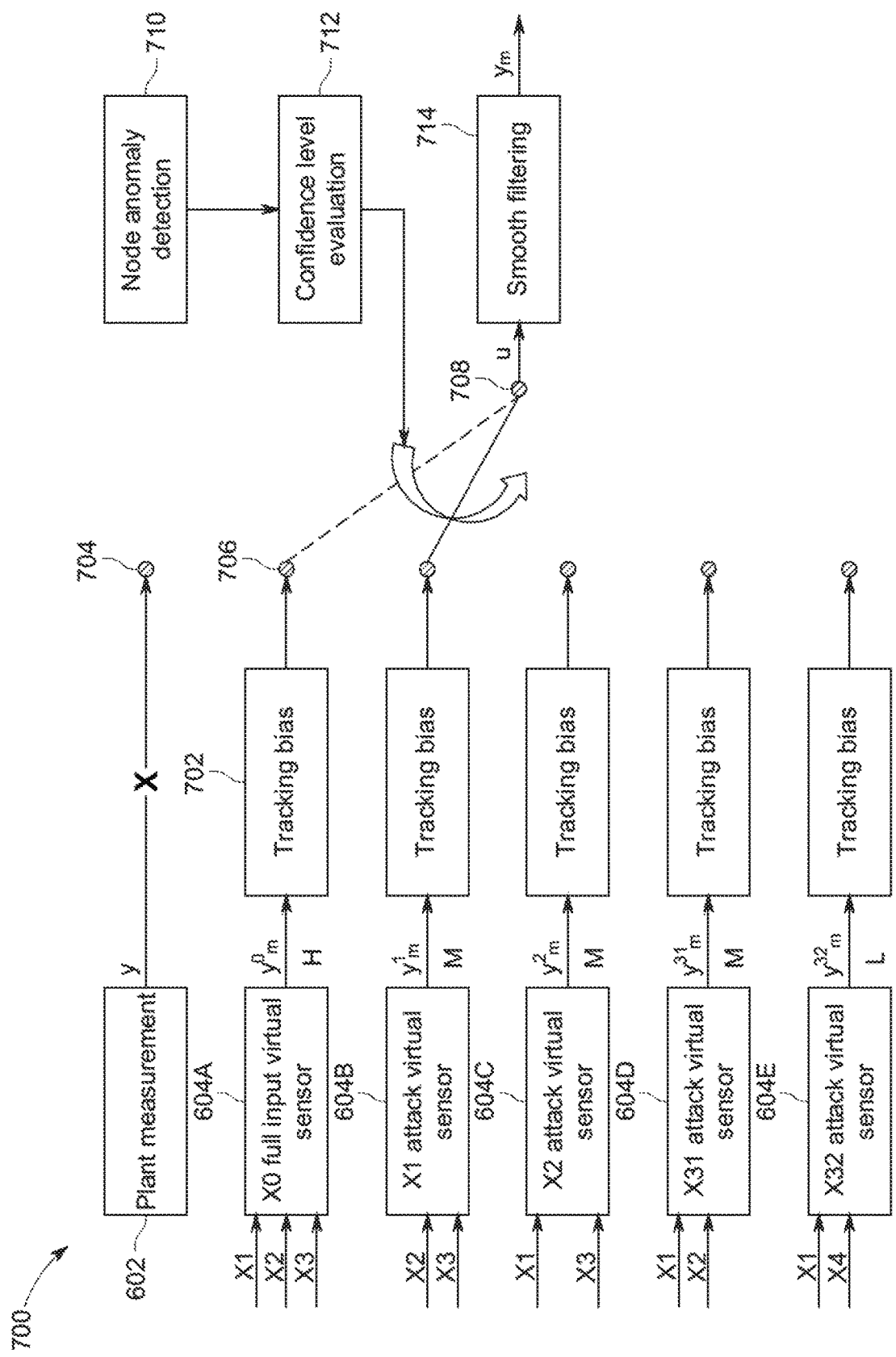
FIG. 7 is a high-level block diagram of an online process in which a critical node is under attack in accordance with some embodiments.

FIG. 7 is a high-level block diagram 700 of an online process in which a critical node is under attack in accordance with some embodiments. FIG. 7 shows multiple virtual sensors with different accuracy and reliability operating during normal and abnormal conditions. As illustrated in FIG. 7, critical node y is under attack. Node anomaly detection module 710 detects normal or abnormal condition of the critical node y using an anomaly detection and localization algorithm. If the node anomaly detection module 710 indicates the relevant nodes are normal, then the plant measurement y 704 is selected to pass to receiver node 708, which is transformed into the final output $y_m$. If the node anomaly detection module 710 indicates that critical node y is abnormal (e.g., failed or under attack), then a confidence level evaluation module 712 evaluates which virtual sensor model to be selected based on their associated confidence level and integrity of virtual sensor's input. For example, FIG. 7 shows that the X0 model is selected due to its highest confidence level. In this case, the receive node 708 will be connected with X0 full input virtual sensor model output node 706.

A tracking bias 702 for each virtual sensor model stores the statistical average difference (or bias) between an idle virtual sensor output and a live virtual sensor (or measurement) output, or alternately between the virtual sensor and an active sensor. In some embodiments, the statistical average calculation may be based on a moving window of a predetermined time period such as the last hour, last day, last week, or last month depending upon a particular application. This output correction mechanism enhances the accuracy of the virtual sensor output by storing and compensating the model error during the degradation process from the most accurate model (e.g., raw measurement) to the least accurate model (e.g., a virtual sensor model with the lowest confidence level. In some embodiments, a smooth filter 714 may use an exponential filter to provide a smooth transfer or bump-less transfer between measurements and virtual sensors, as shown by the following equation:

$$y^m(t) = \alpha \cdot y^m(t) + (1-\alpha) \cdot u$$

In this case, the reconstructed output $y_m$ can be used for continuous control operation.

Figure 8:
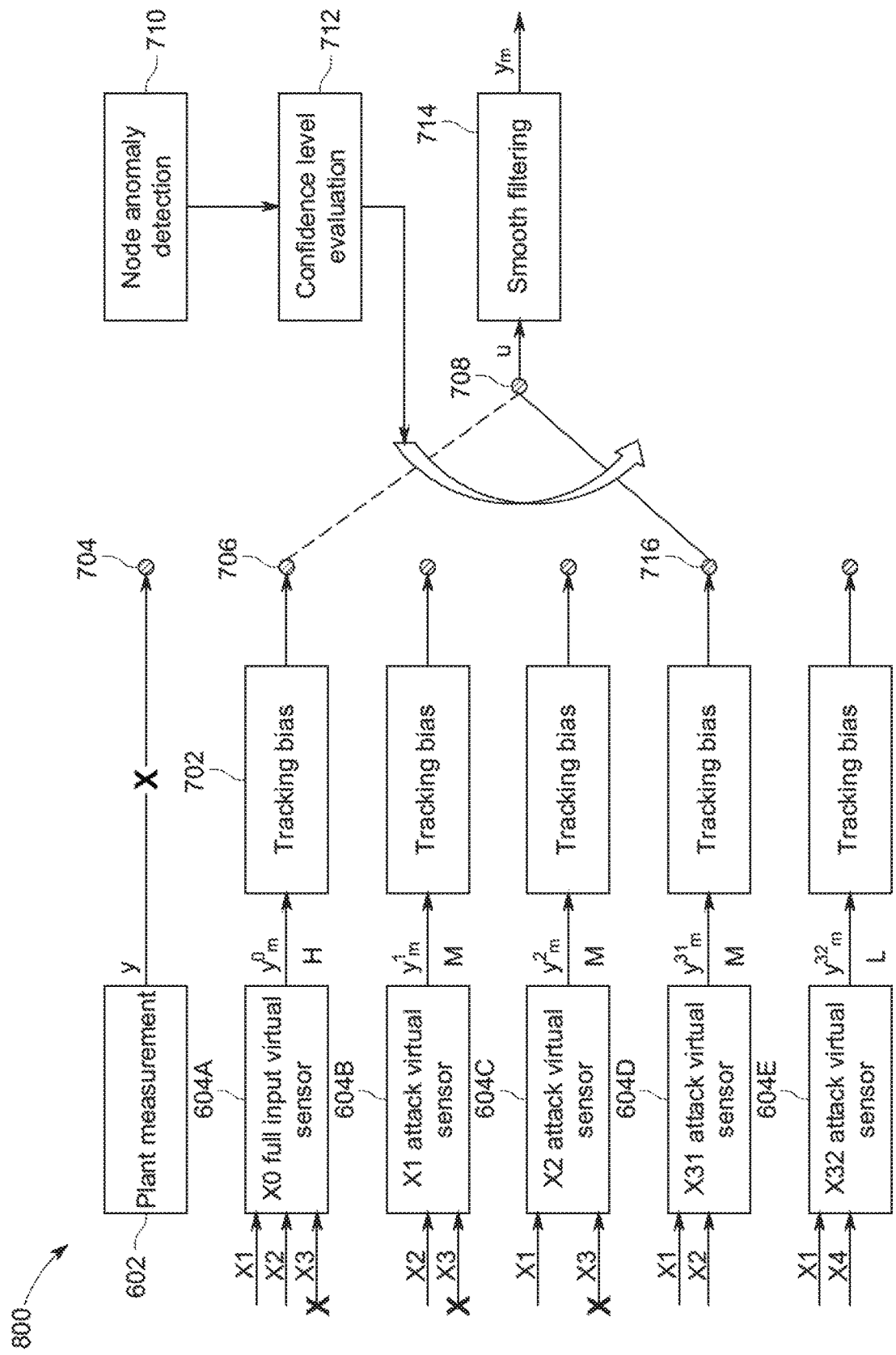
FIG. 8 is a high-level block diagram of an online process in which a critical node and an additional node are under attack in accordance with some embodiments.

FIG. 8 is a high-level block diagram 800 of an online process in which a critical node and an additional node are under attack in accordance with some embodiments. FIG. 8 illustrates handling of a situation during failure or attack of model input node X3 while the critical node y is still not recovered from a previous attack. The node anomaly detection module 710 indicates that critical node y is abnormal (e.g., failed or under attack) and further, that the model input X3 also begins to fail or is under attack. The confidence level evaluation module 712 uses the virtual sensor models that do not use X3. For example, FIG. 8 shows that the X31 attack virtual sensor model 604D is selected due to its highest confidence level. In this case, the receive node 708 is connected with the X31 virtual sensor model output node 716. The tracking bias module 702 ensures that the model error in X31 virtual sensor model 604D is compensated, while the smooth filter 714 continues to provide a smooth transfer or bump-less transfer between measurements and virtual sensors.

Figure 9:
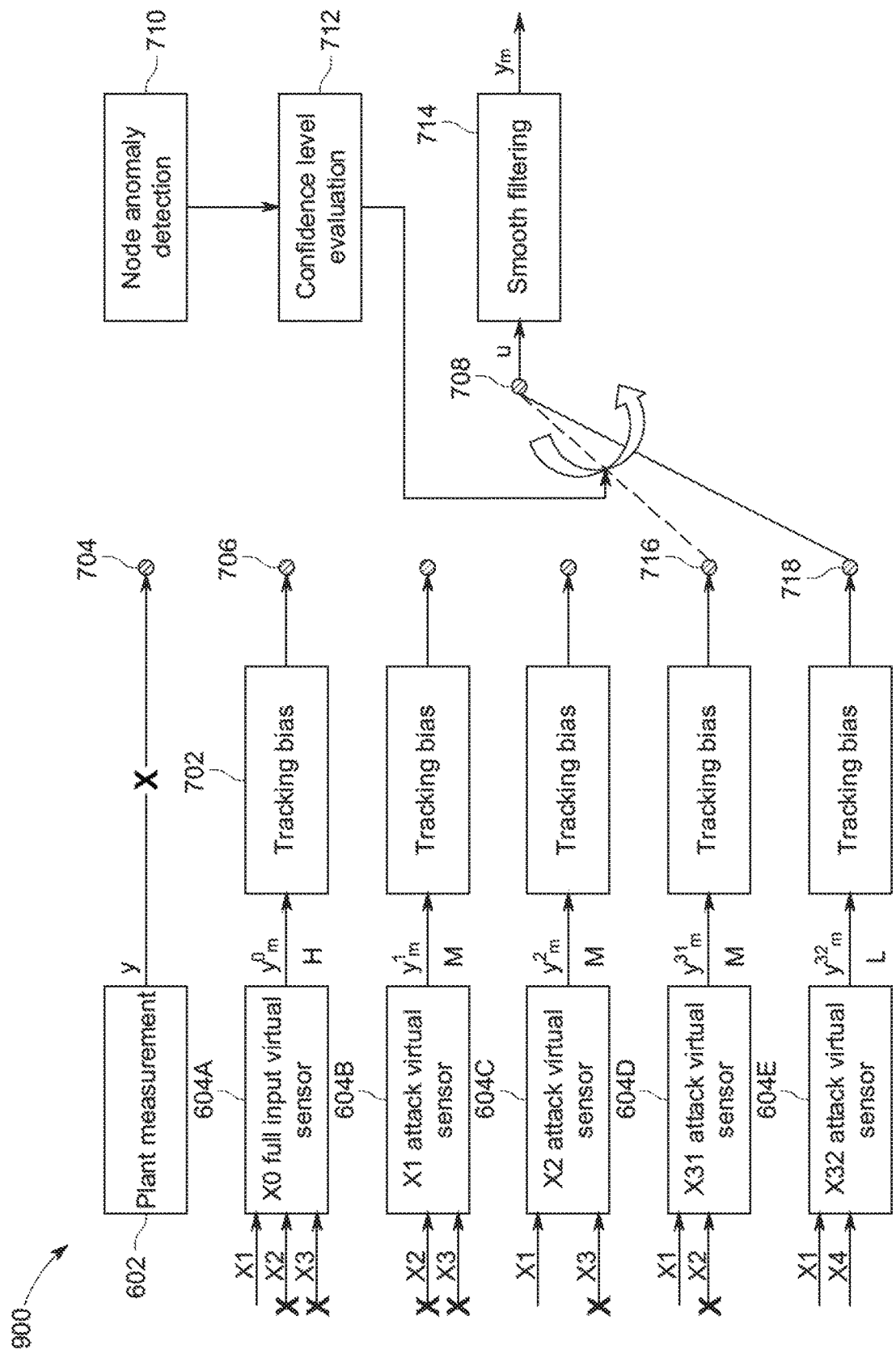
FIG. 9 is a high-level block diagram of an online process in which a critical node and multiple additional nodes are under attack in accordance with some embodiments.

FIG. 9 is a high-level block diagram 900 of an online process in which a critical node and multiple additional nodes are under attack in accordance with some embodiments. FIG. 9 illustrates handling of a situation during failure or attack of a third model input node X2 while the critical node y and model input node X3 are still not recovered from a previous attack. In this situation, the confidence level evaluation module 712 has only one choice of virtual sensor models, which is X32 attack virtual sensor model 604E, even though the confidence level is the lowest. However, this is preferable to forcing the system to enter shutdown especially when the shutdown cost is very high in terms of economic loss and life consumption loss.

Figure 10:
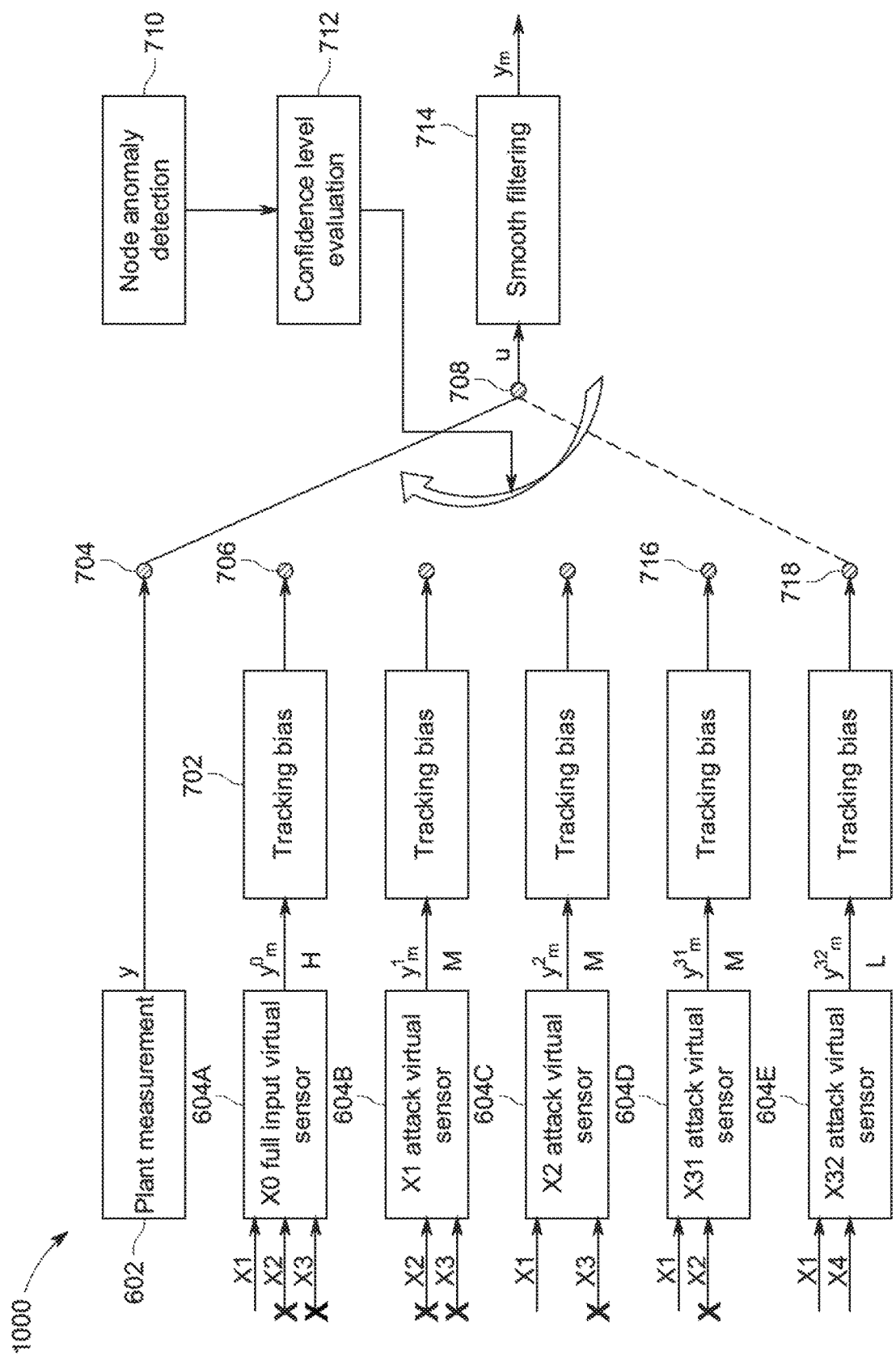
FIG. 10 is a high-level block diagram of an online process after recovery of a critical node in accordance with some embodiments.

FIG. 10 is a high-level block diagram 1000 of an online process after recovery of a critical node in accordance with some embodiments. FIG. 10 shows the system behavior when the measurement of critical node y recovers back to normal. In this situation, node anomaly detection module 710 switches from the X32 virtual sensor model 604E to the raw measurement y from plant 602. In some embodiments, to avoid the uttering effect or frequent switching between models due to state flipping from node anomaly detection module 710, confidence evaluation module 712 may use a hysteresis mechanism (or a delayed response). For example, if the node anomaly detection module 710 indicates that the measurement y recovers at a time to, the confidence evaluation module 712 may not trigger the action to switch from the X32 virtual sensor model 604E to the raw measurement y until after a predefined time period has elapsed, such as five seconds. In particular embodiments, the predefined time may be based on the open loop time constants or closed loop time constants.

Figure 11:
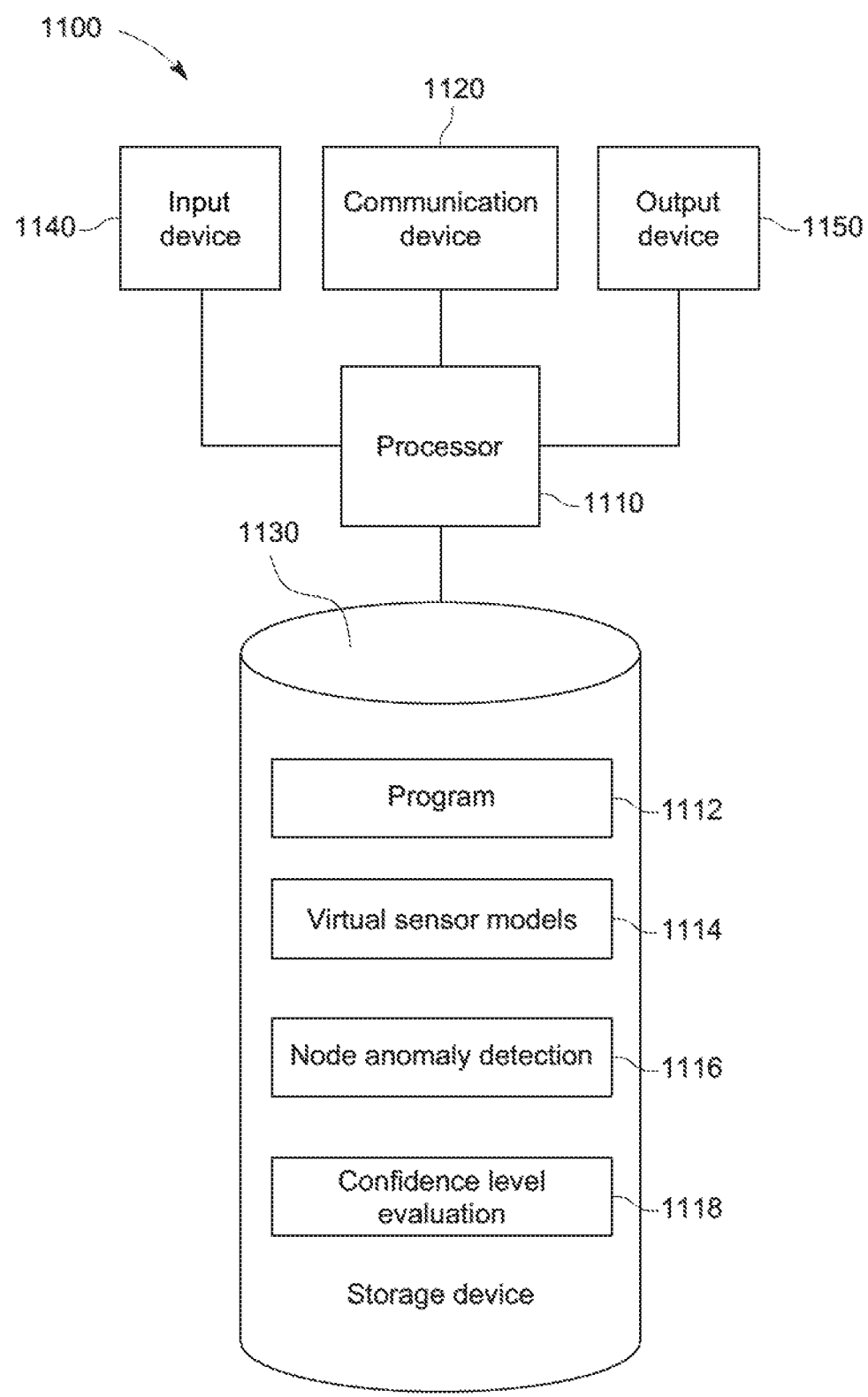
FIG. 11 is a block diagram of attack neutralization platform according to some embodiments.

FIG. 11 is a block diagram of attack neutralization platform 1100 for an industrial asset that may be, for example, associated with the system 200 of FIG. 2 and/or any other system described herein. The attack neutralization platform 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote monitoring nodes, user platforms, etc. . . . The attack neutralization platform 1100 further includes an input device 1140 (e.g., a computer mouse and/or keyboard) and/an output device 1150 (e.g., a computer monitor to render a display, provide alerts, transmit recommendations, and/or create reports). According to some embodiments, a mobile device, monitoring physical system, and/or PC may be used to exchange information with the attack neutralization platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112, a node anomaly detection module 1116, and/or a confidence level evaluation module 118 for controlling the processor 1110. The storage device 1130 further stores a plurality of virtual sensor models 1114. The processor 1110 performs instructions of the programs 1112, 1116, and 1118, and thereby operates in accordance with any of the embodiments described herein.

The programs 1112, 1116, 1118 may be stored in a compressed, uncompiled and/or encrypted format. The programs 1112, 1116, 1118 may furthermore include other program elements, such as an operating system, clipboard application, a database management system, and/or device drivers used by the processor 1110 to interface with peripheral devices.

As used herein, information may be "received" by or "transmitted" to, for example: (i) the attack neutralization platform 1100 from another device; or (ii) a software application or module within the attack neutralization platform 1100 from another software application, module, or any other source.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention. For example, although some embodiments are focused on fuel cells, any of the embodiments described herein could be applied to other types of industrial assets including gas turbines, power grids, dams, locomotives, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A method for neutralizing an attack on a control system of an industrial asset, comprising:
   detecting an anomaly in a first sensor node associated with a first unit of the industrial asset, the first unit operating in a first operational mode;
   receiving time series data associated with the first sensor node;
   providing a subset of the received time series data to each of a plurality of virtual sensor models associated with the first sensor node;
   selecting a first virtual sensor model from among the plurality of virtual sensor models associated with the first sensor node, wherein each virtual sensor model is based upon the provided subset of the time series data received by each of the plurality of virtual sensor models;
   determining a first confidence level of the selected first virtual sensor model;
   determining that the first confidence level is below a first confidence level threshold;
   transferring, responsive to the determining that the first confidence level is below the first confidence level threshold, the first unit to a second operational mode, wherein the transfer to the second operational mode applies the sensor readings associated with a second sensor node of a second unit of the industrial asset to the first unit;
   determining a third confidence level of the first virtual sensor;
   determining that the third confidence level is below a second confidence level threshold and greater than the first confidence level threshold; and
   transferring the first unit to a third operational mode responsive to the determining that the third confidence level is below the second confidence level threshold and greater than the first confidence level threshold.

2. The method of claim 1, further comprising:
   determining a second confidence level of the first virtual sensor;
   determining that the second confidence level is not below the first confidence level threshold; and
   maintaining the first unit in the first operational mode responsive to the determining that the second confidence level is not below the first confidence level threshold.

3. The method of claim 1, wherein the transferring of the first unit to the second operation mode is facilitated by a direct connection between the first unit and the second unit.

4. The method of claim 1, wherein the transferring of the first unit to the second operation mode is facilitated by a controller in communication with the first unit and the second unit.

5. The method of claim 1, wherein the second unit is identified based upon pattern matching among a plurality of available units and the first unit.

6. The method of claim 5, wherein the pattern matching is based upon a similarity metric of feature data from the plurality of available units and the first units.

7. The method of claim 1, wherein the transferring the first unit to the second operational mode is further responsive to determining that the second unit is not under attack.

8. The method of claim 1, wherein the industrial control system is a modular control system for one or more of a fuel cell, a wind farm, or an energy storage system.

9. The method of claim 1, wherein each of the plurality of virtual sensor models are provided with a different subset of the time series data.

10. A method for neutralizing an attack on a control system of an industrial asset, comprising:
    detecting an anomaly in a first sensor node associated with a first unit of the industrial asset, the first unit operating in a first operational mode;
    receiving time series data associated with the first sensor node;
    providing a subset of the received time series data to each of a plurality of virtual sensor models associated with the first sensor node;
    selecting a first virtual sensor model from among the plurality of virtual sensor models associated with the first sensor node, wherein each virtual sensor model is based upon the provided subset of the time series data received by each of the plurality of virtual sensor models and the first virtual sensor model includes a statistical bias evaluation module configured to calculate a statistical average difference between the virtual sensor and an active sensor;
    determining a first confidence level of the selected first virtual sensor model;
    determining that the first confidence level is below a first confidence level threshold; and
    transferring, responsive to the determining that the first confidence level is below the first confidence level threshold, the first unit to a second operational mode, wherein the transfer to the second operational mode applies the sensor readings associated with a second sensor node of a second unit of the industrial asset to the first unit.

11. The method of claim 10, wherein the statistical bias calculation is based upon a moving window of a predetermined time period.

12. The method of claim 1, further comprising filtering an output of the first virtual sensor model to produce a reconstructed output.

13. The method of claim 1, wherein the first confidence level is determined based upon a relative performance of each of the plurality of virtual sensor models during an offline training phase.

14. The method of claim 1, wherein the first confidence level is determined based upon a cost function applied to a level of disruption cause by each of a plurality of operating states of the first unit.

15. A method for neutralizing an attack on a control system of an industrial asset, comprising:
  detecting an anomaly in a first sensor node associated with a first unit of the industrial asset, the first unit operating in a first operation mode;
  receiving time series data associated with the first sensor node;
  providing a subset of the received time series data to each of a plurality of virtual sensor models associated with the first sensor node;
  selecting a first virtual sensor model from among the plurality of virtual sensor models associated with the first sensor node, wherein each virtual sensor model is based upon the provided subset of the time series data received by each of the plurality of virtual sensor models;
  determining a first confidence level of the selected first virtual sensor model, wherein the first confidence level is determined based upon one of: a relative performance of each of the plurality of virtual sensor models during an offline training phase and a cost function applied to a level of disruption caused by each of a plurality of operating states of the first unit;
  determining that the first confidence level is below a first confidence level threshold; and
  transferring, responsive to the determining that the first confidence level is below the first confidence level threshold, the first unit to a second operational mode, wherein the transfer to the second operational mode applies the sensor readings associated with a second sensor node of a second unit of the industrial asset to the first unit.

16. The method of claim 15, further comprising:
  determining a second confidence level of the first virtual sensor;
  determining that the second confidence level is not below the first confidence level threshold; and
  maintaining the first unit in the first operational mode responsive to the determining that the second confidence level is not below the first confidence level threshold.

17. The method of claim 15, further comprising:
  determining a third confidence level of the first virtual sensor;
  determining that the third confidence level is below a second confidence level threshold and greater than the first confidence level threshold; and
  transferring the first unit to a third operational mode responsive to the determining that the third confidence level is below the second confidence level threshold and greater than the first confidence level threshold.

18. The method of claim 15, wherein the transferring of the first unit to the second operation mode is facilitated by a direct connection between the first unit and the second unit.

* * * * *